(12) United States Patent
Morimatsu et al.

(10) Patent No.: US 7,187,099 B1
(45) Date of Patent: Mar. 6, 2007

(54) COMPONENT OF A ROTATING ELECTRICAL MACHINE (75) Inventors: Masaki Morimatsu, Mori-machi (JP); Takeo Ito, Mori-machi (JP)

(73) Assignee: Kabushiki Kaisha Moric, Shuuchi-Gun (JP)

( * ) Notice: Subject to any disclaimer, the term of this patent is extended or adjusted under 35 U.S.C. 154(b) by 1195 days.

(21) Appl. No.: 09/723,016

(22) Filed: Nov. 27, 2000

(30) Foreign Application Priority Data

Dec. 1, 1999 (JP) ................................. 11-342216

(51) Int. Cl.
H02K 3/52 (2006.01)
(52) U.S. Cl. ......................................... 310/194; 310/71
(58) Field of Classification Search ................ 310/194, 310/71, 68; H02K 3/52
See application file for complete search history.

(56) References Cited

U.S. PATENT DOCUMENTS

| | | | |
|---|---|---|---|
| 4,656,378 A | * | 4/1987 | Atherton et al. .............. 310/42 |
| 5,606,208 A | * | 2/1997 | Sakashita et al. ........... 310/194 |
| 5,969,455 A | * | 10/1999 | Sakamoto .................... 310/194 |

FOREIGN PATENT DOCUMENTS

| | | | |
|---|---|---|---|
| JP | 04-368445 | * | 12/1992 |
| JP | 4-368445 | | 12/1992 |
| JP | 7-163077 | * | 6/1995 |
| JP | 07-163077 | * | 6/1995 |

OTHER PUBLICATIONS

Manual Translation of Makoto et al. "Stator for a Magnetoelectric Generator", Japanese Patent 07163077, Jun. 1995.*

* cited by examiner

*Primary Examiner*—Karl Tamai
(74) *Attorney, Agent, or Firm*—Ernest A Beutler (57) ABSTRACT

An electrical machine having a plurality of pole pieces surrounded by bobbins and upon which individual coil windings are formed. The bobbins are formed by a insulating material in which are embedded electrical connectors that have terminal ends that afford connection to the coil windings and to an external connection for either deriving electrical power in the case the machine operates as a generator or receiving power in the event the device operates as a motor. Thus, cost is reduced and at the same time the device is more compact and more efficiency.

12 Claims, 7 Drawing Sheets

COMPONENT OF A ROTATING ELECTRICAL MACHINE

BACKGROUND OF THE INVENTION

This invention relates to a component for a rotating electrical machine and more particularly to an improved arrangement for forming the windings and electrical connections for a component that cooperates with relatively rotatable permanent magnets for machine operation.

In most rotating electrical equipment, there is either a rotating or fixed element that comprises a core having a plurality of teeth around which individual windings are wound. Frequently, these windings are positioned on bobbins that surround the core teeth and which are electrically non-conductive.

In order to provide electrical connections for either delivery of electrical power to these windings, if the machine is a motor, or transmission of electrical power from the windings, if it is a generator, it is necessary to provide connections between respective winding coils and terminals of outside conductors. Normally these connections are made by soldered connections between the terminal ends and the core winding ends.

These connections are frequently bunched between the adjacent coils and thus, limit the available space and tend to make the machine larger than necessary. In addition, the formation of these soldered joints requires considerable labor and time and adds significantly to the expense of the machine. In addition, the use of the separate soldered connections also raises the possibility of poor connections or connections that can become easily broken. Furthermore, it is necessary to provide the external connection wires to be fastened to the core by some external fastening means such as screws or the like.

It is, therefore, a principle object to this invention to provide an improved component for an electrical machine having wound coils that eliminate the necessity for soldered connections.

It is a further object to this invention to provide an improved component of this type for a rotating electrical machine wherein the size can be kept more compact and the efficiency of the machine significantly improved.

It is a further object to this invention to provide an improved coil winding arrangement for a rotating machine wherein the electrical connections are simplified and can be made without necessitating considerable hand labor.

SUMMARY OF THE INVENTION

This invention is adapted to be embodied in a component of a rotating electrical machine that is comprised of a plurality of coil windings each wound on the pole teeth of a core through a bobbin. The bobbin has portions that surround the pole teeth of the core and around which the conductors of the coils are wound. The bobbin carries a plurality of wiring conductors and each has one end connected to at least one of the coil ends and the other end connected to one external connection terminal.

DETAILED DESCRIPTION OF THE PREFERRED EMBODIMENT

Figure 1:
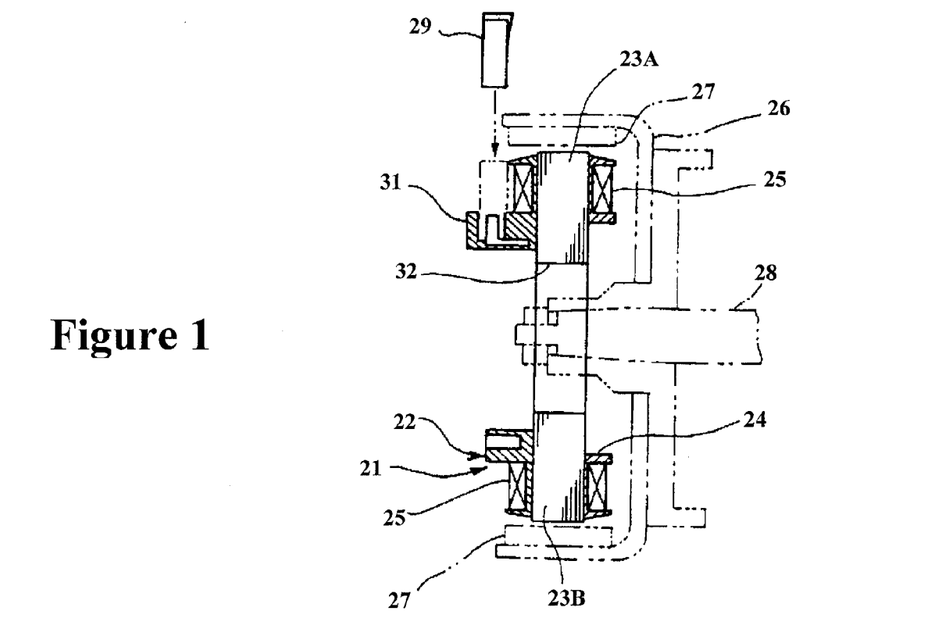
FIG. 1 is a cross sectional view taken through a rotating electrical machine constructed in accordance with an embodiment of the invention and showing, in this embodiment, the stator in cross-section and solid lines with the remaining components of the machine being shown in phantom. This view is taken generally along the line 1-0-5 of FIG. 4.
Figure 2:
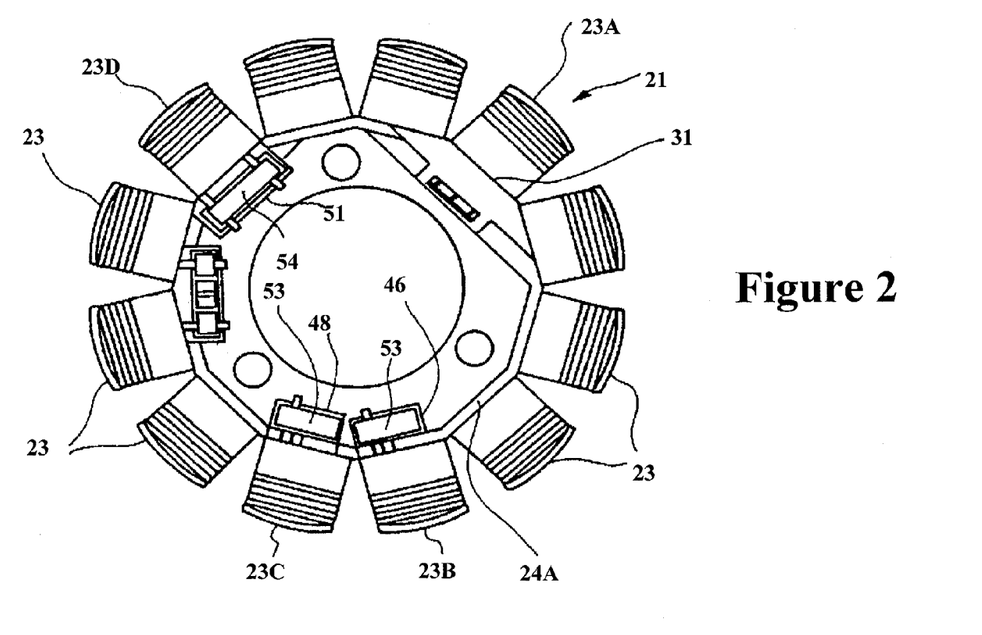
FIG. 2 is a front view of the stator.

Referring first to FIG. 1, a rotating electrical machine constructed in accordance with an embodiment of the invention is identified generally by the reference numeral 21. This invention deals primarily with the coil windings and terminal connections of this machine 21, which, in this embodiment, is embodied in a stator 22 having a plurality, namely 12, of pole pieces or cores 23 and associated bobbins of a bobbin assembly 24 on which coil windings 25 are wound, in a manner to be described.

In this particular embodiment of the machine, the stator 22 is fixed against rotation in any suitable manner. The stator 22 cooperates with a rotating cup-shape member 26 that carries a plurality of circumferentially spaced permanent magnets 27. This cup-shape member 26 is affixed for rotation with a shaft 28.

By way of example, the rotating machine 21 may comprise an electrical generator wherein a voltage is induced in the coil windings 25 upon rotation of the magnets 27 to provide electrical current output. Alternatively, the mechanism may comprise an electric motor as will become apparent to those skilled in the art. Also, although the invention is described in conjunction with a stator, certain facets of the invention may also be employed where the rotor carried the coil windings.

From the description of the problem of the prior art contained in the "Background Of The Invention" section of the specification, it should be apparent that the invention deals primarily with the manner in which the windings 25 are associated with the cores 23 and the electrical connections thereto. One of the male electrical connectors for the external electrical connection appears in FIG. 1 and is identified generally by the reference numeral 29. This male electrical connector 29 cooperates with a female external terminal or connector 31 formed on the stator 22 around an annular opening 32 formed therein, which a portion of the shaft 28 passes.

Figure 3:
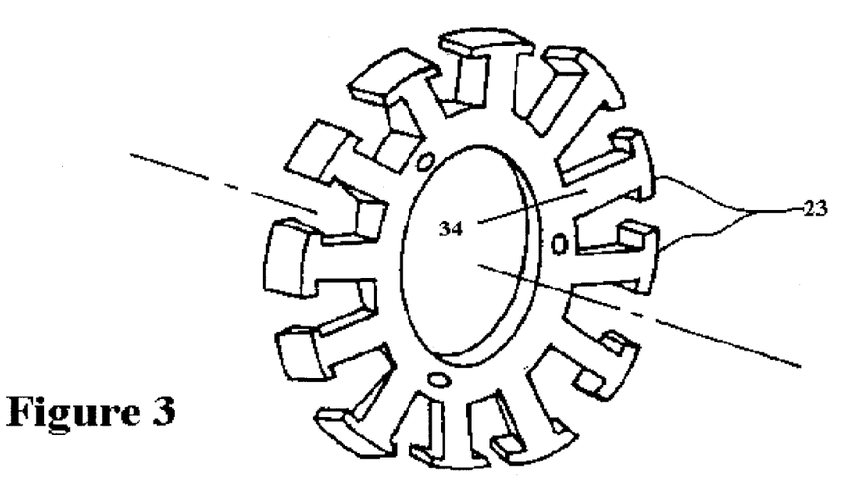
FIG. 3 is a perspective view of the stator core.

Referring now primarily to FIG. 3, the core 23 is formed of a laminated construction consisting of silicon or carbon steel plates laminated with insulating layers. This forms the plurality of cores or pole pieces 23, certain of which are numbered alphabetically, that extend outwardly from a hub portion 34. Each of the pole pieces 23 has an enlarged headed portion.

Figure 5:
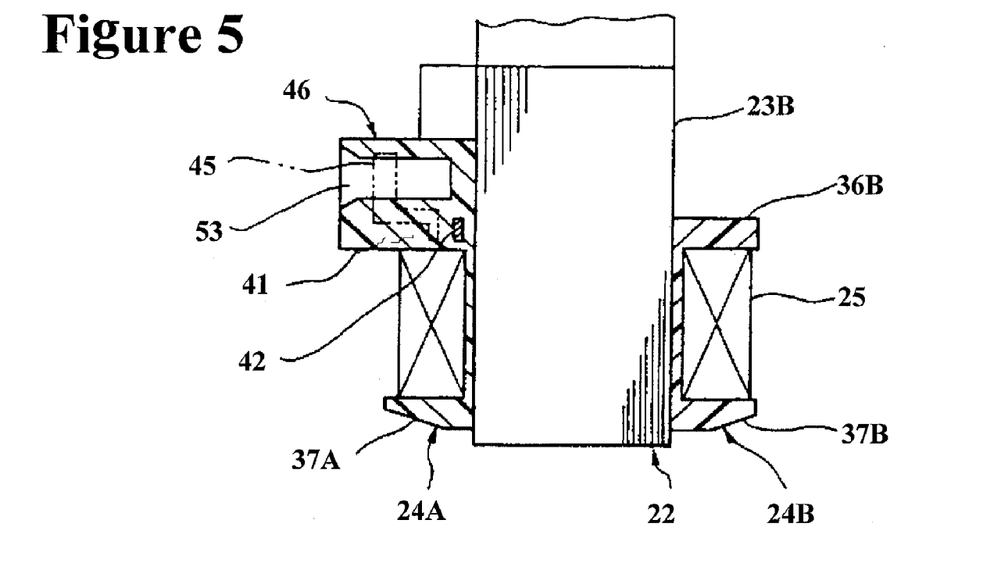
FIG. 5 is an enlarged cross sectional view taken along the line O-5 of FIG. 4.
Figure 6:
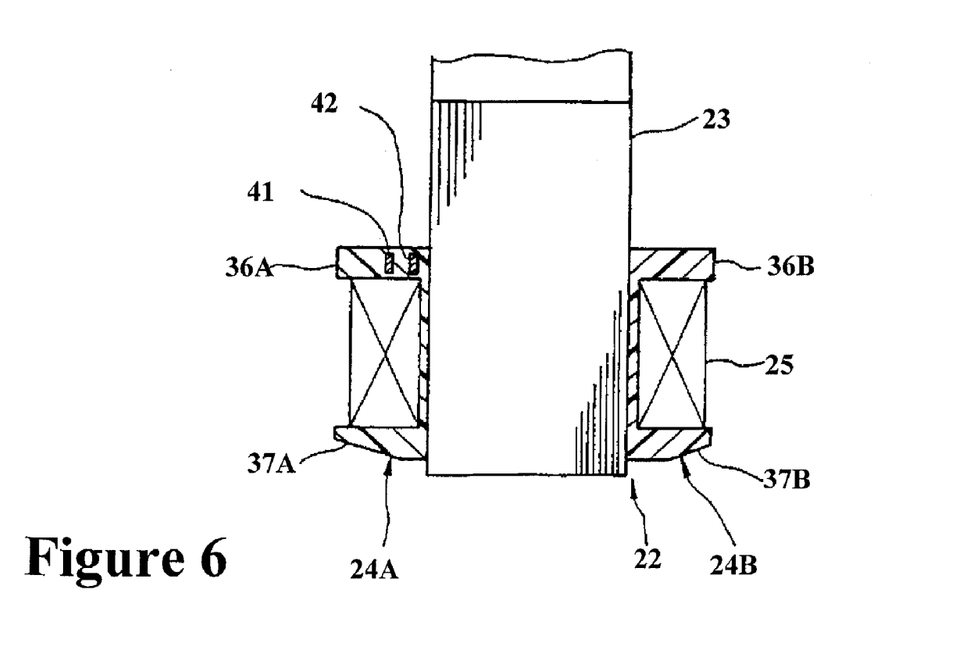
FIG. 6 is an enlarged cross section along line O-6 of FIG. 4.
Figure 7:
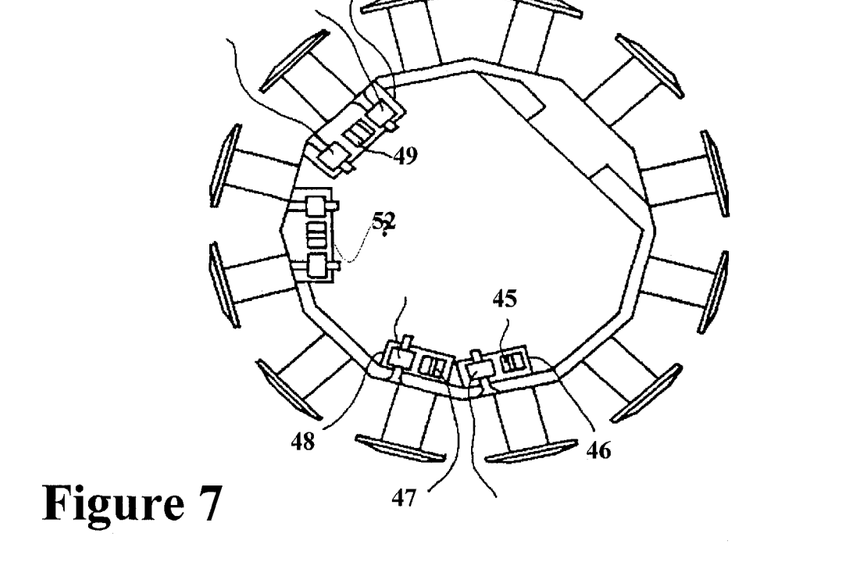
FIG. 7 is a front view of one of the bobbin halves.

As may be best seen in the cross-sectional views of FIGS. 5 and 6, the bobbin assembly, indicated generally by the reference numeral 24 is associated with the cores 23 and is formed from a pair of mating pieces or halves 24A and 24B. The bobbin halves 24A and 24B are snugly received around the pole pieces 23 and each has a pair of flanges 36 and 37 around which the individual coil windings 25 are wound in a manner which will be described. The bobbin halves 24A and 24B are made from a suitable insulating resin by injection molding.

During this molding process, a number of conductors, which may be formed from stamped metallic pieces, are embedded in one or both of the bobbin halves 24A and 24B. In the illustrated embodiment, all of these conductors are mounted in a side enlargement of the bobbin half 24A and these conductors appear best in FIG. 8.

The conductors, indicated generally by the reference numerals 39, 41 and 42, have common output terminals that lie in side by side relationship as best seen in FIG. 3 and which form terminal ends Y, B and W, designated as color coding of the individual conductors 39, 41 and 42, respectively. The conductors 39, 41 and 42 are formed preferably as stamped blanks of a highly conductive material such as copper. Opposite ends of these conductors 39, 41 and 42 are associated with certain of the coil windings 25 in a manner to be described so as to simplify the connections thereto and the entire electrical structure and to avoid the necessity of having soldered connections.

The external female communication terminal 31 encircles the terminal ends Y, B and W of the individual conductors 39, 41 and 42 so as to receive the connector 29 when pressed together in a radial direction and form the desired electrical connections. This construction appears best in FIGS. 1, 2 and 9 through 13.

As may be seen, particularity from these latter four figures, the bobbin half 24A is formed with a pair of openings 43 that receive tabs 44 formed on the external female connector 29. This provides a snap together connection being made as seen in these three figures. Wires Y, B and W are carried by the connector 29 and cooperate with the terminal ends of the corresponding designation. Thus, electrically power can be extracted through these conductors. This external female terminal 31 is formed adjacent a pole piece indicated at 23A.

Figure 8:
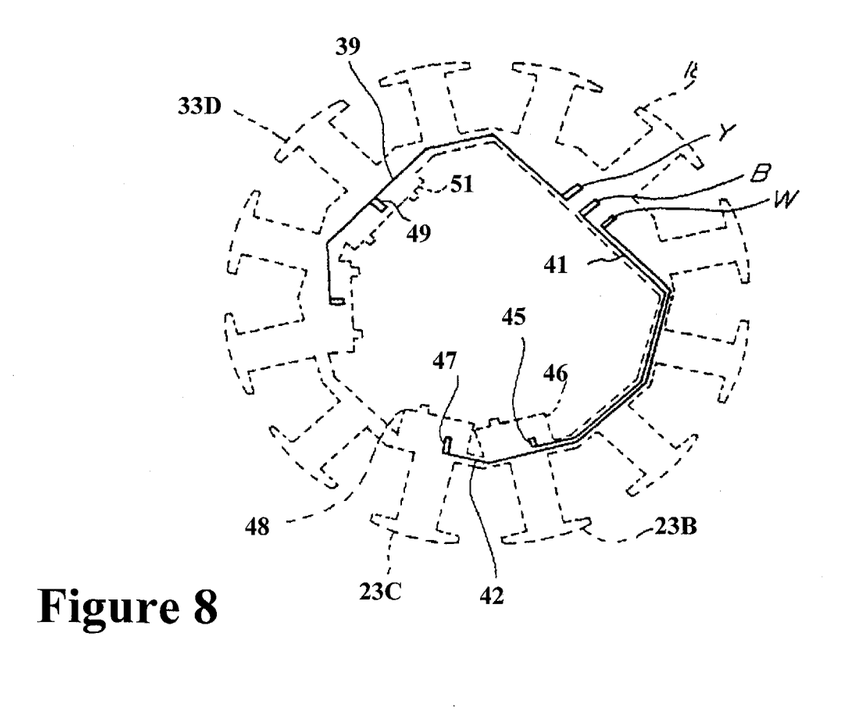
FIG. 8 is a view looking in the same direction as FIG. 7 showing the arrangement of the inserted wiring conductors in solid lines with the body of the bobbin half shown in phantom.
Figure 9:
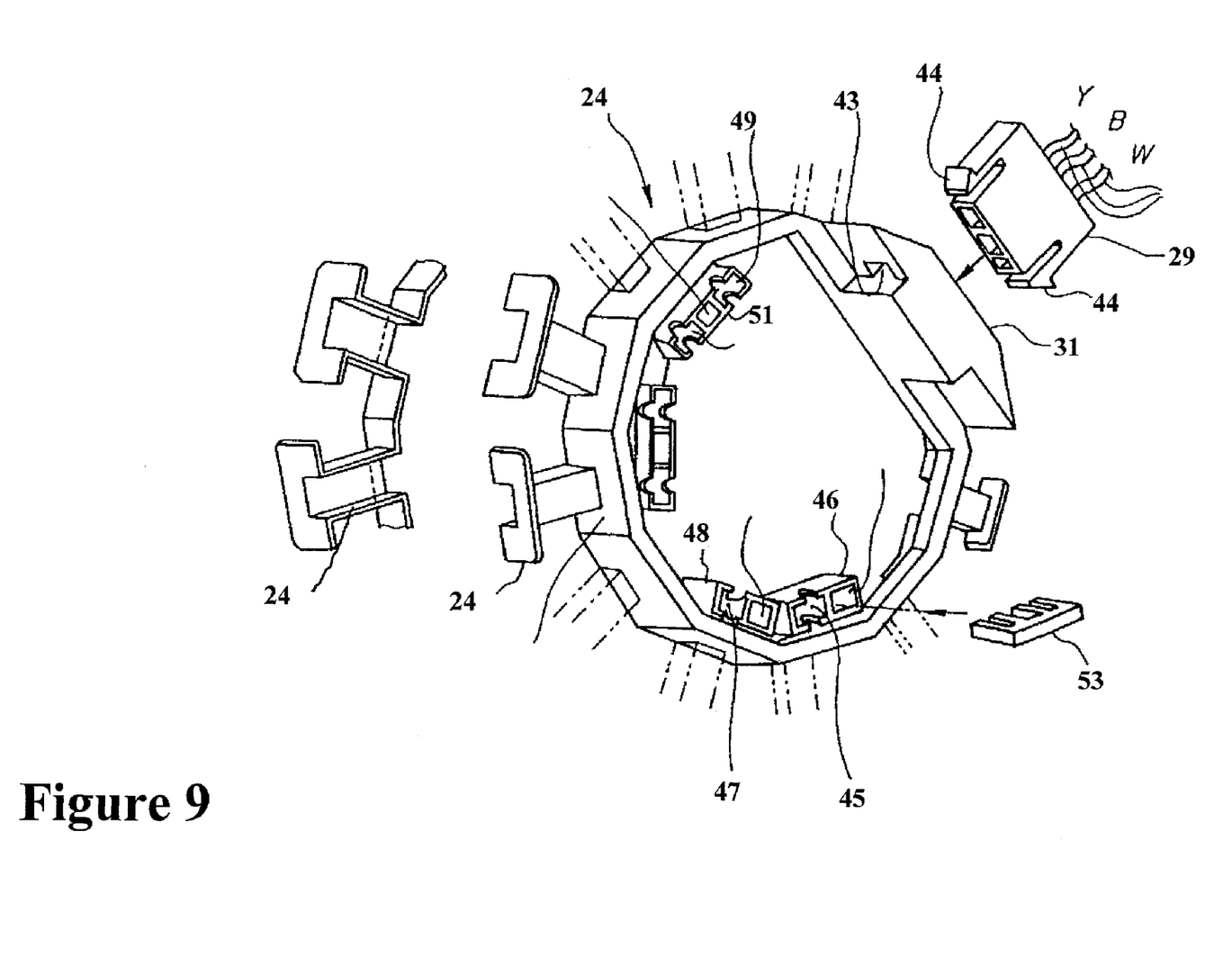
FIG. 9 is an exploded perspective view of the bobbin half shown in FIGS. 7 and 8 and showing the relation to the associated electrical connectors or terminals and the other bobbin half that is shown broken away.
Figure 10:
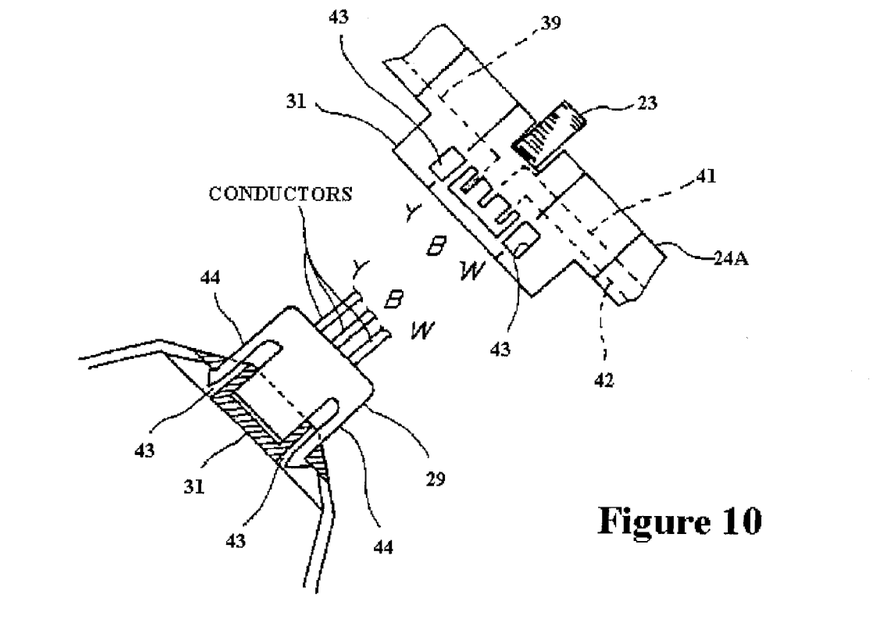
FIG. 10 is an exploded front view of one of the external connections and associated electrical connector shown in FIG. 9.
Figure 11:
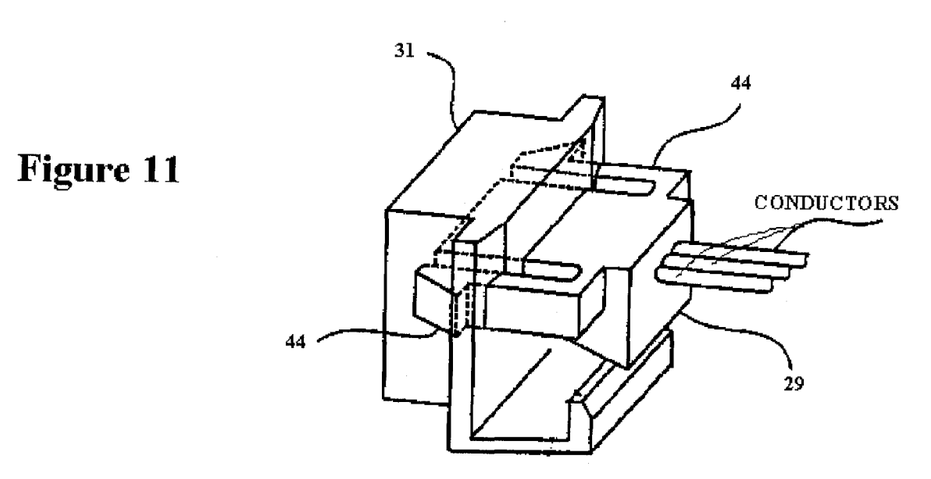
FIG. 11 is a perspective view of the components shown in FIG. 10 in the coupled state.
Figure 12:
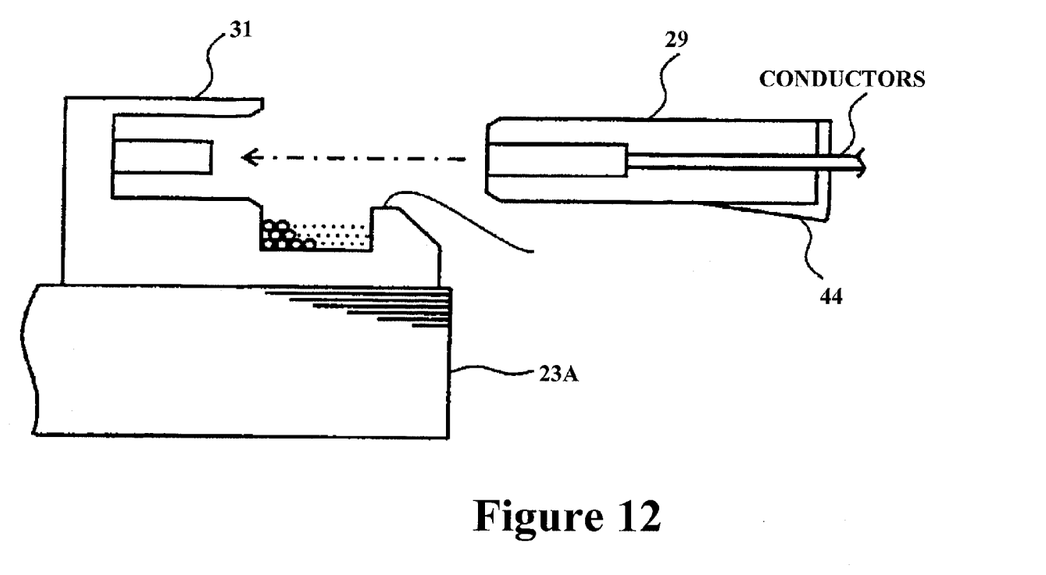
FIG. 12. is a cross sectional view showing the first step coupling movement of the external connection terminal and its associated electrical connector shown in FIGS. 10 and 11.
Figure 13:
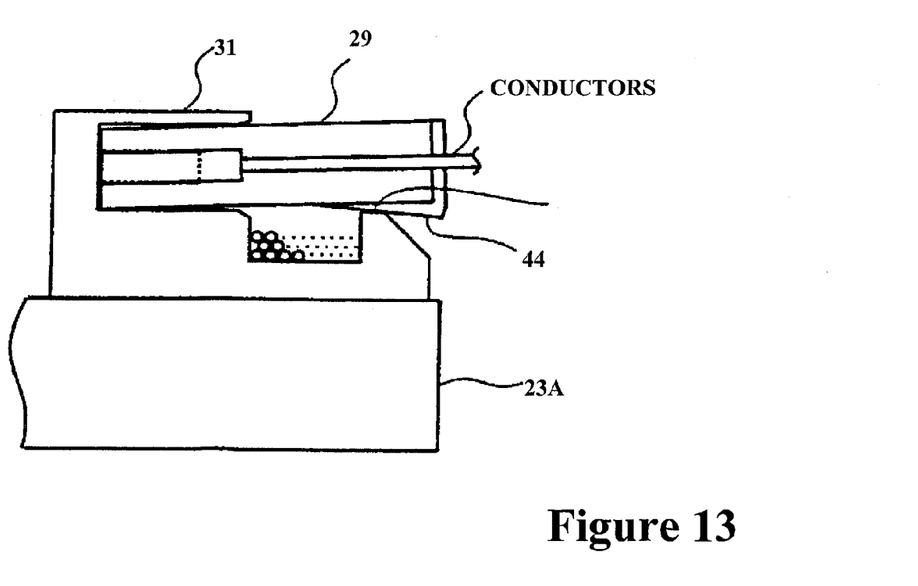
FIG. 13. is a cross sectional view, in part similar to FIG. 12, showing the completion of the electrical connection.

The conductor 41 extends from its terminal end B in a clockwise direction around the bobbin half 24A and terminates adjacent the fifth pole (23A) counting in a clockwise direction from the pole 23A at a terminal 45. This terminal 45 extends up to the base of the magnetic pole 23B and terminates in a further female electrical connector 46 formed in the bobbin half 24A and integrally with it. In a similar manner, the conductor 42 extends circumferentially around from the first pole 23A past the fifth pole 23B to the sixth pole 23C where it forms a terminal end 47. This terminal end 47 terminates in a further female electrical connector 48 formed integrally with the bobbin half 24A.

Finally, the conductor 39 extends in a counter clockwise direction from the terminal end Y to a terminal end formed adjacent the tenth pole 23D at a terminal end 49. This terminal end 49 extends to the base of the core 23D and terminates in a female external electrical connector 51.

Between the terminal female connectors 48 and 51 there is formed a further housing portion 52. In the illustrated embodiment, this housing portion 52 serves no purpose. However, it can be utilized in other embodiments as an electrical connector where other winding arrangements in addition to those, which will be described shortly, are employed.

Figure 4:
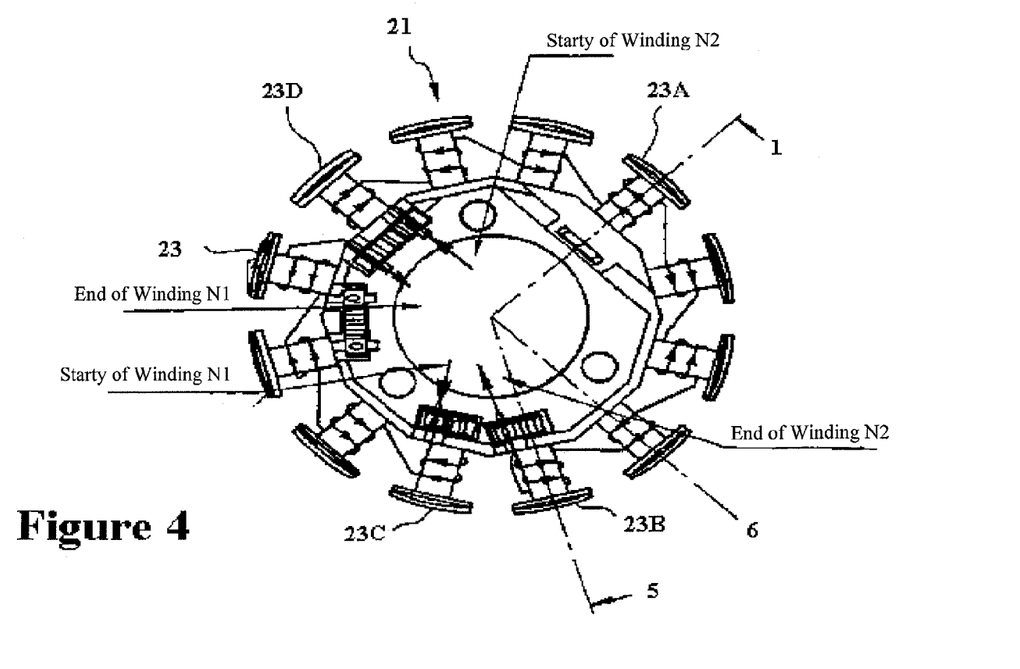
FIG. 4 is a front view of the stator coils showing the winding direction thereof.

Referring now primarily to FIG. 4, in the illustrated embodiment the twelve poles 23 and their associated windings 25 are formed in two groups, the first consisting of a winding N1 which begins at the terminal end 47 where it is connected by means of inserting it into an opening formed in a tip of the terminal end 47 thus avoiding the necessity for soldering. This winding is then wound around the sixth pole 23C and specifically the portion of the bobbin 24 that is associated with it and then without interruption wound around the next three poles 23 and terminates at a conductor terminal found at the base of the eleventh pole 23D in the electrical connector 49. These ends are seen in FIG. 4.

In a similar manner, a second winding N2 begins at a terminal formed in the electrical connector 51 and is wound around the eleventh pole 23D and more specifically its bobbin and the succeeding eight poles traveling in the clockwise direction to terminate at the pole 23B where it terminates in the electrical connector 46.

Thus, it should be readily seen that there are no soldered connections and the windings can extend continuously around the stator and have their connections to the terminals formed in the housings 51, 48 and 45. It will be seen that the housing pieces 46 and 48 have two conductor receiving openings while the housing portion 51 has three openings. These openings bridge the respective conductors to which the coil ends are affixed and receive coupling devices 53, in the case of the two-terminal openings 46 and 48, and 54, in the case of the three-opening housing 51. These connectors 53 and 54 have internal wiring that form the completion of the circuits between the coil ends so as to further simplify the overall wiring and again avoid soldered terminals.

Therefore, it should be readily apparent that the described construction provides a very compact coil winding arrangement for a rotating machine and one in which no soldered connections are required. Also, because of the good electrical connections the power losses are minimized and the efficiency of the device significantly improves. In addition, because there are no soldered connections, the likelihood of failure of the connections is substantially reduced and hence, the life of the associated machine can be prolonged while continuing to maintain a good power output of efficiency depending upon whether the device operates as a generator or a motor.

Of course, the foregoing description is that of a preferred embodiment of the invention and various changes and modifications may be made without departing from the spirit and scope of the invention, as defined by the appended claims.

The invention claimed is:

1. A component of a rotating machine comprised of a plurality of coils each wound on the pole teeth of a core through a bobbin, said bobbin having portions surrounding said pole teeth of said core for receiving coil windings and an integral terminal portion spaced radially from the coil windings, a plurality of wiring conductors carried by said bobbin coil winding receiving portions, each of said wiring conductors having one terminal end connected at least one of said coil ends and the other terminal end connected to one external electrical connector through said terminal portion, said coils being combined into at least two groups with the coils of each group being continuously wound from a single wire conductor extending between ends of said wiring conductors.

2. A component of a rotating machine as set forth in claim 1 wherein the other ends of said single wire conductors are connected to other terminal end of the wiring connectors at a common external electrical connector.

3. A component of a rotating machine as set forth in claim 2 wherein the common external electrical connector is adapted to cooperate with a detachable electrical connector through a male, female connection.

4. A component of a rotating machine as set forth in claim 3 wherein the male, female connection is made in a direction that extends radially to the axis of rotation of said machine.

5. A component of a rotating machine comprised of a plurality of coils each wound on the pole teeth of a core through a bobbin, said bobbin having portions surrounding said pole teeth of said core for receiving coil windings and an integral terminal portion spaced radially from the coil windings, a plurality of wiring conductors carried by said bobbin coil winding receiving portions, each of said wiring conductors having one terminal end connected at least one of said coil ends and the other terminal end connected to one external electrical connector through said terminal portion, said bobbin being formed integrally with a plurality of internal wiring connectors each being formed with a terminal hole into which is led a coil end and with terminal hole into which is led one end of the wiring conductors, and further including a connecting block to be inserted in both of said terminal holes and provided with a connection circuit for connecting said coil ends and said wiring conductors with said coils being combined into at least two groups with the coils of each group being continuously wound from a single wire conductor extending between ends of said wiring conductors.

6. A component of a rotating machine as set forth in claim 5 wherein the other ends of said single wire conductors are connected to other terminal end of the wiring connectors at a common external electrical connector.

7. A component of a rotating machine as set forth in claim 6 wherein the common external electrical connector is adapted to cooperate with a detachable electrical connector through a male, female connection.

8. A component of a rotating machine as set forth in claim 7 wherein the male, female connection is made in a direction that extends radially to the axis of rotation of said machine.

9. A component of a rotating machine as set forth in claim 8 wherein the bobbin is comprised of mating halves.

10. A component of a rotating machine as set forth in claim 9 wherein the bobbin mating halves encircle the pole teeth.

11. A component of a rotating machine as set forth in claim 10 wherein the conductors are all carried by one of the mating bobbin halves.

12. A component of a rotating machine as set forth in claim 11 wherein the one of the mating bobbin halves is molded the conductors molded into the one mating bobbin half.

* * * * *